(12) United States Patent
Hotelling et al.

(10) Patent No.: US 9,086,774 B2
(45) Date of Patent: Jul. 21, 2015

(54) DUAL CONFIGURATION FOR DISPLAY DATA LINES

(71) Applicant: Apple Inc., Cupertino, CA (US)

(72) Inventors: Steven Porter Hotelling, Los Gatos, CA (US); Marduke Yousefpor, San Jose, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/312,489

(22) Filed: Jun. 23, 2014

(65) Prior Publication Data

US 2014/0375603 A1    Dec. 25, 2014

Related U.S. Application Data

(63) Continuation of application No. 12/545,557, filed on Aug. 21, 2009, now Pat. No. 8,760,412.

(60) Provisional application No. 61/149,267, filed on Feb. 2, 2009.

(51) Int. Cl.
*G06F 3/045* (2006.01)
*G06F 3/044* (2006.01)
(Continued)

(52) U.S. Cl.
CPC .............. *G06F 3/044* (2013.01); *G06F 3/0412* (2013.01); *G09G 3/3648* (2013.01); *G09G 3/3696* (2013.01); *G06F 2203/04107* (2013.01); *G09G 2310/0297* (2013.01)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| CN | 1246638 A | 3/2000 |
| CN | 1527274 A | 9/2004 |

(Continued)

OTHER PUBLICATIONS

Chinese Search Report completed Dec. 14, 2011, for CN Patent Application No. ZL201020108330X, Filed Feb. 2, 2010, with English Translation, 22 pages.

(Continued)

*Primary Examiner* — Nicholas Lee
(74) *Attorney, Agent, or Firm* — Morrison & Foerster LLP

(57) ABSTRACT

A display having data lines that can be configured between a display mode and a touch mode is disclosed. The display can have sense regions for sensing a touch or near touch on the display during the touch mode. These same regions can display graphics or data on the display during the display mode. During display mode, the data lines in the sense regions can be configured to couple to display circuitry in order to receive data signals from the circuitry for displaying. During touch mode, the data lines in the sense regions can be configured to couple to corresponding sense lines in the regions, which in turn can couple to touch circuitry, in order to transmit touch signals to the circuitry for sensing a touch or near touch. Alternatively, during touch mode, the data lines in the sense regions can be configured to couple to ground in order to transmit residual data signals to ground for discarding.

21 Claims, 11 Drawing Sheets

(51) Int. Cl.
*G06F 3/041* (2006.01)
*G09G 3/36* (2006.01)

(56) References Cited

U.S. PATENT DOCUMENTS

| | | |
|---|---|---|
| 5,835,079 A | 11/1998 | Shieh |
| 5,880,411 A | 3/1999 | Gillespie et al. |
| 6,057,903 A | 5/2000 | Colgan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,907,126 B2 | 3/2011 | Yoon et al. |
| 8,479,122 B2 | 7/2013 | Hotelling et al. |
| 8,760,412 B2 | 6/2014 | Hotelling et al. |
| 8,922,521 B2 | 12/2014 | Hotelling et al. |
| 2005/0007353 A1 | 1/2005 | Smith et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0062140 A1 | 3/2008 | Hotelling et al. |
| 2008/0062148 A1 | 3/2008 | Hotelling et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0309627 A1 | 12/2008 | Hotelling et al. |
| 2010/0001973 A1 | 1/2010 | Hotelling et al. |
| 2010/0194695 A1 | 8/2010 | Hotelling et al. |
| 2010/0194698 A1 | 8/2010 | Hotelling et al. |

FOREIGN PATENT DOCUMENTS

| | | |
|---|---|---|
| EP | 1 455 264 A2 | 9/2004 |
| EP | 1 455 264 A3 | 9/2004 |
| EP | 1 455 264 B1 | 9/2004 |
| JP | 2000-163031 A | 6/2000 |
| JP | 2002-342033 A | 11/2002 |
| JP | 2005-301373 A | 10/2005 |
| JP | 2008-225415 A | 9/2008 |
| KR | 10-2008-0019125 A | 3/2008 |
| TW | 2008-35294 A | 8/2008 |
| WO | WO-2008/047990 A1 | 4/2008 |
| WO | WO-2010/088659 A1 | 8/2010 |

OTHER PUBLICATIONS

European Search Report mailed Jul. 21, 2010, for EP Patent Application 10151969.2, six pages.

European Search Report mailed Dec. 3, 2012, for EP Patent Application No. 12162177.5, seven pages.

European Search Report mailed Feb. 13, 2013, for EP Patent Application No. 12192450.0, six pages.

Final Office Action mailed Jun. 21, 2013, for U.S. Appl. No. 12/545,754, filed Aug. 21, 2009, 6 pages.

International Search Report mailed Mar. 10, 2010, for PCT Application No. PCT/US2010/22868, filed Feb. 2, 2010, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Oct. 5, 2012, for U.S. Appl. No. 12/545,754, filed Aug. 21, 2009, 10 pages.

Non-Final Office Action mailed Nov. 23, 2012, for U.S. Appl. No. 12/545,557, filed Aug. 21, 2009, 11 pages.

Non-Final Office Action mailed Sep. 10, 2013, for U.S. Appl. No. 12/545,754, filed Aug. 21, 2009, six pages.

Non-Final Office Action mailed Jan. 2, 2014, for U.S. Appl. No. 12/545,754, filed Aug. 21, 2009, 11 pages.

Non-Final Office Action mailed Jan. 3, 2014 , for U.S. Appl. No. 12/545,557, filed Aug. 21, 2009, 9 pages.

Notice of Allowance mailed Jun. 10, 2013, for U.S. Appl. No. 12/545,557, filed Aug. 21, 2009, 9 pages.

Notice of Allowance mailed Apr. 11, 2014, for U.S. Appl. No. 12/545,557, filed Aug. 21, 2009, 9 pages.

Notice of Allowance mailed Aug. 21, 2014, for U.S. Appl. No. 12/545,754, filed Aug. 21, 2009, 10 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI ' 92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

DUAL CONFIGURATION FOR DISPLAY DATA LINES

CROSS REFERENCE TO RELATED APPLICATIONS

This application is a continuation of U.S. application Ser. No. 12/545,557, filed Aug. 21, 2009, published on Aug. 5, 2010 as Publication No. US-2010-0194695-A1, which claims the benefit of U.S. Provisional Application No. 61/149,267, filed Feb. 2, 2009, the contents of which are incorporated herein by reference in their entirety for all purposes.

FIELD

This relates to displays having pixels for both display and touch modes and, more particularly, to displays having pixels with data lines configurable for both display mode and touch mode.

BACKGROUND

Many types of input devices are available for performing operations in a computing system, such as buttons or keys, mice, trackballs, touch sensor panels, joysticks, touch pads, touch screens, and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned behind the panel so that the touch sensitive surface can substantially cover the viewable area of the display device. Touch screens can generally allow a user to perform various functions by touching or near touching the touch sensor panel using one or more fingers, a stylus or other object at a location dictated by a user interface (UI) including virtual buttons, keys, bars, displays, and other elements, being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Because typical touch screens have the touch sensor panel overlaying the display device, the touch screens can be heavier, thicker, and dimmer. A lighter, thinner, and brighter touch screen has been developed in which the touch sensor panel is integrated with the display device to provide both display and touch capabilities. Such a touch screen is described in U.S. patent application Ser. No. 11/760,080, entitled "Touch Screen Liquid Crystal Display," and Ser. No. 12/240,964, entitled "Display with Dual-Function Capacitive Elements," the contents of which are incorporated herein by reference in their entirety for all purposes.

However, because of the dual capabilities of the touch screen, it can be difficult to effectively detect touch on the screen when executing the touch capabilities due to interference, e.g., parasitic capacitance, from the display circuitry. More expense and power could be needed to provide a more robust touch signal that can overcome this difficulty.

SUMMARY

This relates to a display having display and touch modes, in which data lines in a sense region of the display can be configured differently in each mode. In some embodiments, during display mode, one or more data lines in pixels of the display can be configured to couple to display circuitry for displaying graphics or data based on the data signal(s) transmitted along the data lines.

In some embodiments, during touch mode, one or more data lines in pixels in a sense region of the display can be configured to couple to a sense line in the pixels, which is coupled to touch circuitry, for sensing touch or near touch based on the touch signal(s) transmitted from the sense line. In some other embodiments, during touch mode, one or more data lines in pixels in a sense region of the display can be configured to couple to ground.

The configuration of the data lines during touch mode can advantageously reduce parasitic capacitance associated with the data lines during touch mode, thereby improving the effectiveness of the display and reducing its cost and power requirements.

DETAILED DESCRIPTION

In the following description of various embodiments, reference is made to the accompanying drawings in which it is shown by way of illustration specific embodiments which can be practiced. It is to be understood that other embodiments can be used and structural changes can be made without departing from the scope of the embodiments.

This relates to an LCD having display and touch modes, in which data lines in a sense region of the display can be configured differently in each mode. In some embodiments, during display mode, one or more data lines in pixels of the LCD can be configured to couple to display circuitry for displaying graphics and data based on the data signal(s) transmitted along the data lines. In some embodiments, during touch mode, one or more data lines in pixels in a sense region of the LCD can be configured to couple to a sense line in the pixels, which is coupled to touch circuitry, for sensing touch based on the touch signal(s) transmitted from the sense line. In some embodiments, during touch mode, one or more data lines in pixels in a sense region of the LCD can be configured to couple to ground.

The configuration of the data lines during touch mode can advantageously reduce parasitic capacitance associated with the data lines during touch mode, thereby improving the effectiveness of the LCD and reducing its cost and power requirements.

The terms "drive line," "horizontal common voltage line," and "xVcom" can refer to horizontal conductive lines of the LCD. In most cases, though not always, the term "drive line" can be used when referring to these conductive lines in the drive regions when the LCD is in touch mode because the lines can transmit a stimulation signal for driving the drive regions of the display.

The terms "sense line," "vertical common voltage line," and "yVcom" can refer to vertical conductive lines of the LCD. In most cases, though not always, the term "sense line" can be used when referring to these conductive lines in the sense regions when the LCD is in the touch mode because the lines can transmit a touch signal for sensing a touch or near touch on the display.

The term "subpixel" can refer to a red, green, or blue display component of the LCD, while the term "pixel" can refer to a combination of a red, a green, and a blue subpixel.

Although some embodiments may be described herein in terms of LCDs, it should be understood that embodiments are not so limited, but are generally applicable to any devices utilizing display and touch capabilities according to various embodiments.

Figure 1:
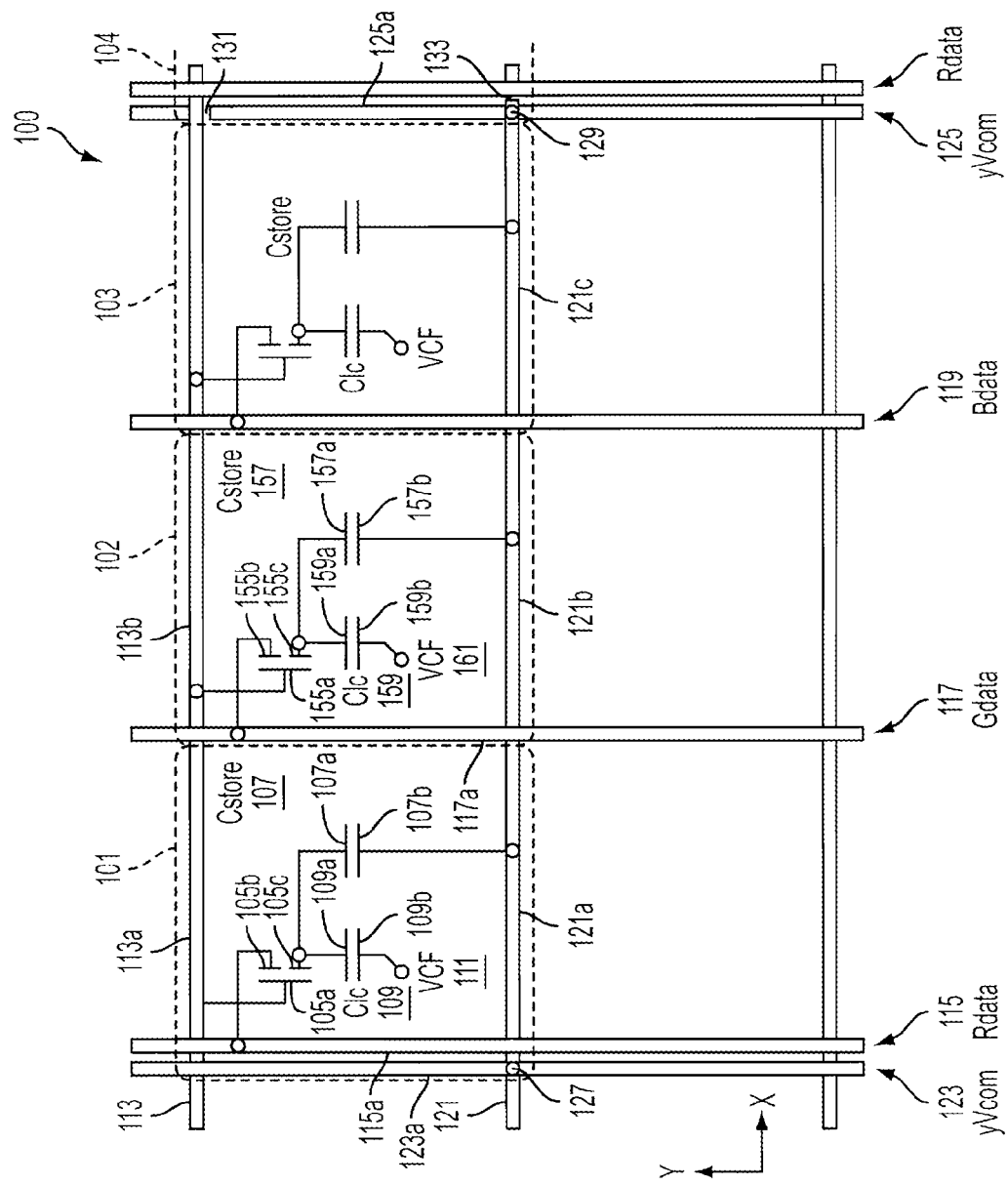
FIG. 1 illustrates a partial circuit diagram of exemplary pixels in an LCD having display and touch modes in which one or more data lines of the pixels can be configured based on the mode according to various embodiments.

FIG. 1 illustrates a partial circuit diagram of exemplary pixels of an LCD having display and touch modes in which one or more data lines of the pixels can be configured based on the mode according to various embodiments. In the example of FIG. 1, LCD 100 can include LCD subpixels according to various embodiments. The subpixels of the LCD 100 can be configured such that they are capable of dual-functionality as both LCD subpixels and touch sensor elements. That is, the subpixels can include circuit elements, such as capacitive elements, electrodes, etc., that can operate as part of the LCD circuitry of the pixels and that can also operate as elements of touch sensing circuitry. In this way, the LCD 100 can operate as an LCD with integrated touch sensing capability. FIG. 1 shows details of subpixels 101, 102, 103, and 104 of the LCD 100. Note that each of the subpixels can represent either red (R), green (G) or blue (B), with the combination of all three R, G and B subpixels forming a single color pixel.

Subpixel 102 can include thin film transistor (TFT) 155 with gate 155a, source 155b, and drain 155c. Subpixel 102 can also include storage capacitor, Cst 157, with upper electrode 157a and lower electrode 157b, liquid crystal capacitor, Clc 159, with subpixel electrode 159a and common electrode 159b, and color filter voltage source, Vcf 161. If a subpixel is an in-plane-switching (IPS) device, Vcf can be, for example, a fringe field electrode connected to a common voltage line in parallel with Cst 157. If a subpixel does not utilize IPS, Vcf 151 can be, for example, an indium-tin-oxide (ITO) layer on the color filter glass. Subpixel 102 can also include a portion 117a of a data line for green (G) color data, Gdata line 117, and a portion 113b of gate line 113. Gate 155a can be connected to gate line portion 113b, and source 155b can be connected to Gdata line portion 117a. Upper electrode 157a of Cst 157 can be connected to drain 155c of TFT 155, and lower electrode 157b of Cst 157 can be connected to a portion 121b of a common voltage line that runs in the x-direction, xVcom 121. Subpixel electrode 159a of Clc 159 can be connected to drain 155c of TFT 155, and common electrode 159b of Clc 159 can connected to Vcf 151.

The circuit diagram of subpixel 103 can be identical to that of subpixel 102. However, as shown in FIG. 1, color data line 119 running through subpixel 103 can carry blue (B) color data. Subpixels 102 and 103 can be, for example, known LCD subpixels.

Similar to subpixels 102 and 103, subpixel 101 can include thin film transistor (TFT) 105 with gate 105a, source 105b, and drain 105c. Subpixel 101 can also include storage capacitor, Cst 107, with upper electrode 107a and lower electrode 107b, liquid crystal capacitor, Clc 109, with subpixel electrode 109a and common electrode 109b, and color filter voltage source, Vcf 111. Subpixel 101 can also include a portion 115a of a data line for red (R) color data, Rdata line 115, and a portion 113a of gate line 113. Gate 105a can be connected to gate line portion 113a, and source 105b can be connected to Rdata line portion 115a. Upper electrode 107a of Cst 107 can be connected to drain 105c of TFT 105, and lower electrode 107b of Cst 107 can be connected to a portion 121a of xVcom 121. Subpixel electrode 109a of Clc 109 can be connected to drain 105c of TFT 105, and common electrode 109b of Clc 109 can be connected to Vcf 111.

Unlike subpixels 102 and 103, subpixel 101 can also include a portion 123a of a common voltage line running in the y-direction, yVcom 123. In addition, subpixel 101 can include a connection 127 that connects portion 121a to portion 123a. Thus, connection 127 can connect xVcom 121 and yVcom 123.

Subpixel 104 (only partially shown in FIG. 1) can be similar to subpixel 101, except that a portion 125a of a yVcom 125 can have a break (open) 131, and a portion 121b of xVcom 121 can have a break 133.

As can be seen in FIG. 1, the lower electrodes of storage capacitors of subpixels 101, 102, and 103 can be connected together by xVcom 121. This can be, for example, a type of connection in known LCD panels and, when used in conjunction with known gate lines, data lines, and transistors, can allow subpixels to be addressed. The addition of vertical common voltage lines along with connections to the horizontal common voltage lines can allow grouping of subpixels in both the x-direction and y-direction, as described in further detail below. For example, yVcom 123 and connection 127 to xVcom 121 can allow the storage capacitors of subpixels 101, 102, and 103 to be connected to storage capacitors of subpixels that are above and below subpixels 101, 102, 103 (the subpixels above and below are not shown). For example, the subpixels immediately above subpixels 101, 102, and 103 can have the same configurations as subpixels 101, 102, and 103, respectively. In this case, the storage capacitors of the subpixels immediately above subpixels 101, 102, and 103 would be connected to the storage capacitors of subpixels 101, 102, and 103.

In general, an LCD can be configured such that the storage capacitors of all subpixels in the panel can be connected together, for example, through at least one vertical common voltage line with connections to horizontal common voltage lines. Another LCD can be configured such that different groups of subpixels can be connected together to form separate regions of connected-together storage capacitors.

One way to create separate regions can be by forming breaks (opens) in the horizontal and/or vertical common lines. For example, yVcom 125 of LCD 100 can have break 131, which can allow subpixels above the break to be isolated from subpixels below the break. Likewise, xVcom 121 can have break 133, which can allow subpixels to the right of the break to be isolated from subpixels to the left of the break.

Touch regions of an LCD can be formed by groups of pixels (each pixel including a red, green, and blue subpixel as in FIG. 1) electrically connected together to form drive regions for driving stimulation signals and to form sense regions for sensing a touch or near touch of an object, such as a finger, during touch mode.

Figure 2:
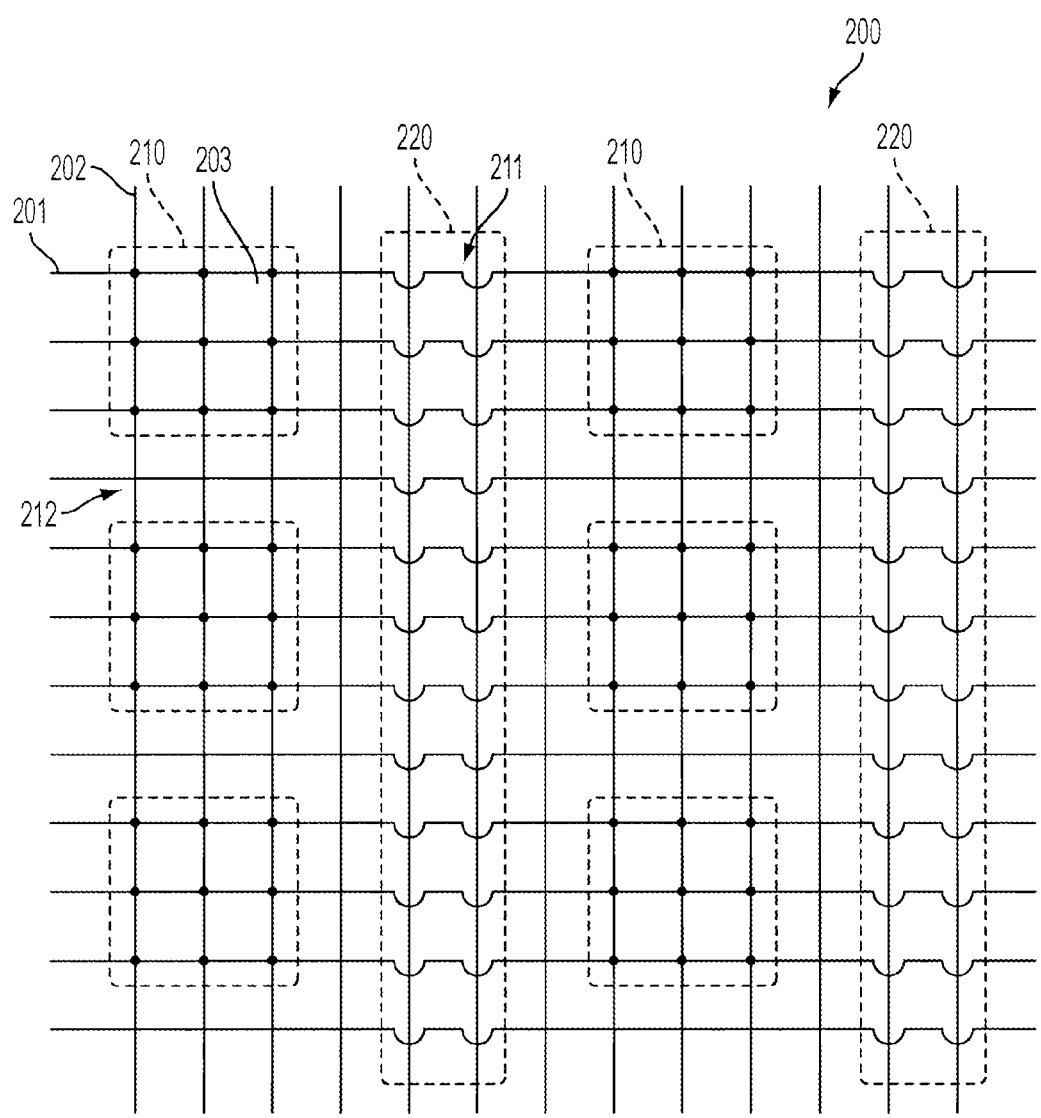
FIG. 2 illustrates an exemplary LCD having display and touch modes in which touch regions can be formed by groups of pixels in the LCD according to various embodiments.

FIG. 2 illustrates an exemplary LCD having display and touch modes in which touch regions can be formed by groups of pixels in the LCD according to various embodiments. In the example of FIG. 2, LCD 200 can have touch regions, which can include drive regions 210 and sense regions 220. The drive regions 210 and the sense regions 220 can include groups of pixels 203, which can display graphics or data in the display mode and sense touch or near touch in the touch mode. For simplicity, each pixel 203 is shown as a single block with a vertical common voltage line yVcom 202 and a horizontal common voltage line xVcom 201, where each single pixel block can represent a group of red, green, and blue subpixels each having a data line, as shown in FIG. 1.

A drive region 210 can be formed by connecting at least one vertical common voltage line yVcom 202 of a pixel 203 with at least one horizontal common voltage line xVcom 201 of the pixel, thereby forming a drive region including a row of pixels. A drive plate (e.g., an ITO plate) can be used to cover the drive region and connect to the vertical and horizontal common voltage lines so as to group the pixels together to form the drive region for touch mode. Generally, a drive region can be larger than a single row of pixels, comparable to the size of a finger tip, for example, in order to effectively receive a touch or near touch on the LCD. For example, a drive region can be formed by connecting vertical common voltage lines yVcom with horizontal common voltage lines xVcom, thereby forming a drive region including a matrix of pixels. In some embodiments, drive regions proximate to each other can share horizontal common voltage lines xVcom as drive lines, which can be used to stimulate the drive regions with stimulation signals. In some embodiments, drive regions proximate to each other can share vertical common voltage lines yVcom with breaks 212 in the lines between the drive regions in order to minimize the lines causing parasitic capacitance that could interfere with the received touch or near touch. Optionally and alternatively, the vertical common voltage line breaks can be omitted and the lines shared in their entirety among the drive regions.

A sense region 220 can be formed by at least one vertical common voltage line yVcom 202 of a pixel, thereby forming a sense region including a column of pixels. A sense plate (e.g., an ITO plate) can be used to cover the sense region and connect to the vertical common voltage line without connecting to a cross-under horizontal common voltage line so as to group the pixels together to form the sense region for touch mode. Generally, a sense region can be larger than a single column of pixels in order to effectively sense a received touch or near touch on the touch sensitive device. For example, a sense region can be formed by vertical common voltage lines yVcom, thereby forming a sense region including a matrix of pixels. In some embodiments, a sense region can use the vertical common voltage lines yVcom as sense lines, which can transmit a touch signal based on a touch or near touch on the display. In the sense region, the vertical common voltage lines yVcom can be unconnected from and can cross over the horizontal common voltage lines xVcom at positions 211 to form a mutual capacitance structure for touch sensing. This cross over of yVcom and xVcom can also form additional parasitic capacitance between the sense and drive ITO regions that can be minimized.

In operation during touch mode, the horizontal common voltage lines xVcom 201 can transmit stimulation signals to stimulate the drive regions 210 to form electric field lines between the stimulated drive regions and adjacent sense regions 220. When an object, such as a finger, touches or near touches a stimulated drive region 210, the object can affect some of the electric field lines extending to the adjacent sense regions 220, thereby reducing the amount of charge coupled to these adjacent sense regions. This reduction in charge can be sensed by the sense regions 220 as an "image" of touch. This touch image can be transmitted along the vertical common voltage lines yVcom 202 to touch circuitry for further processing.

The drive regions of FIG. 2 are shown as rectangles connected in rows across the LCD and the sense regions of FIG. 2 are shown as rectangles extending the vertical length of the LCD. However, the drive and sense regions are not limited to the shapes, orientations, and positions shown, but can include any suitable configurations according to various embodiments. It is to be understood that the pixels used to form the touch regions are not limited to those described above, but can be any suitable pixels having display and touch capabilities according to various embodiments.

Parasitic capacitance can develop in a sense region of the LCD according to various embodiments. For example, parasitic capacitance can form between a data line and a sense plate or between a data line and an xVcom line. Such parasitic capacitance can interfere with touch circuitry operation, in particular with a touch circuit's ability to effectively measure a touch signal generated based on a touch or near touch on the LCD. FIGS. 3-7 illustrate exemplary circuits that can attenuate the effects of this and other parasitic capacitance on touch circuitry operation according to various embodiments.

Figure 3:
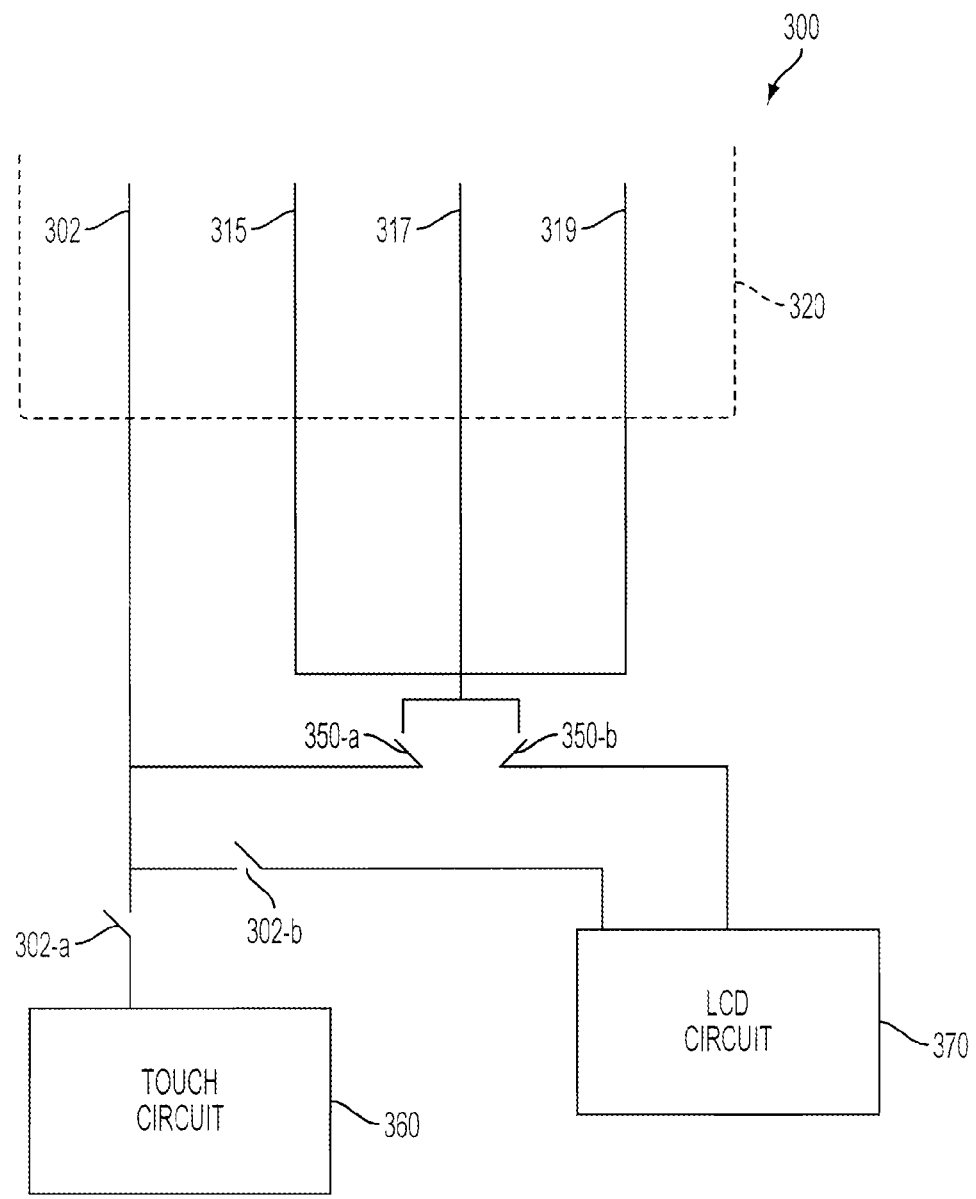
FIG. 3 illustrates a partial circuit diagram of an exemplary pixel in an LCD having display and touch modes in which one or more data lines of the pixel can be configured to couple with a sense line of the pixel during touch mode according to various embodiments.

FIG. 3 illustrates a partial circuit diagram of an exemplary pixel in an LCD having display and touch modes in which one or more data lines of the pixel can be configured to couple with a sense line of the pixel during touch mode according to various embodiments. In the example of FIG. 3, circuit 300 can include pixels having sense region 320, where each pixel can have sense line 302, which can be yVcom, and red, green, and blue data lines 315, 317, 319, respectively. Although only one pixel is illustrated in FIG. 3, it is to be understood that a sense region can include pixels having sense lines and red, green, and blue data lines according to various embodiments.

For touch mode, sense line 302 can couple to touch circuit 360 for sensing a touch or near touch based on touch signals transmitted over the sense line. Switch 302-*a* can couple the sense line 302 to the touch circuit 360. Data lines 315, 317, 319 can couple to the sense line 302 so as to form one electrical load on the touch circuit 360, thereby reducing the parasitic capacitance formed between the data lines and the sense plate and avoiding adverse operation of the touch circuit. The data lines 315, 317, 319 can couple together and switch 350-*a* can couple the data lines via the sense line 302 to the touch circuit 360 for sensing a touch or near touch.

For display mode, data lines 315, 317, 319 can couple to LCD circuit 370 for displaying graphics or data based on display data signals transmitted over the data lines. The data lines 315, 317, 319 can couple together and switch 350-*b* can couple the data lines to the LCD circuit 370, which can then transmit data signals along the data lines for displaying graphics or data on the LCD. The sense line 302 can couple to the LCD circuit 370 to hold an xVcom signal when not being used for touch. Switch 302-*b* can couple the sense line 302 to xVcom from the LCD circuit 370.

Figure 4:
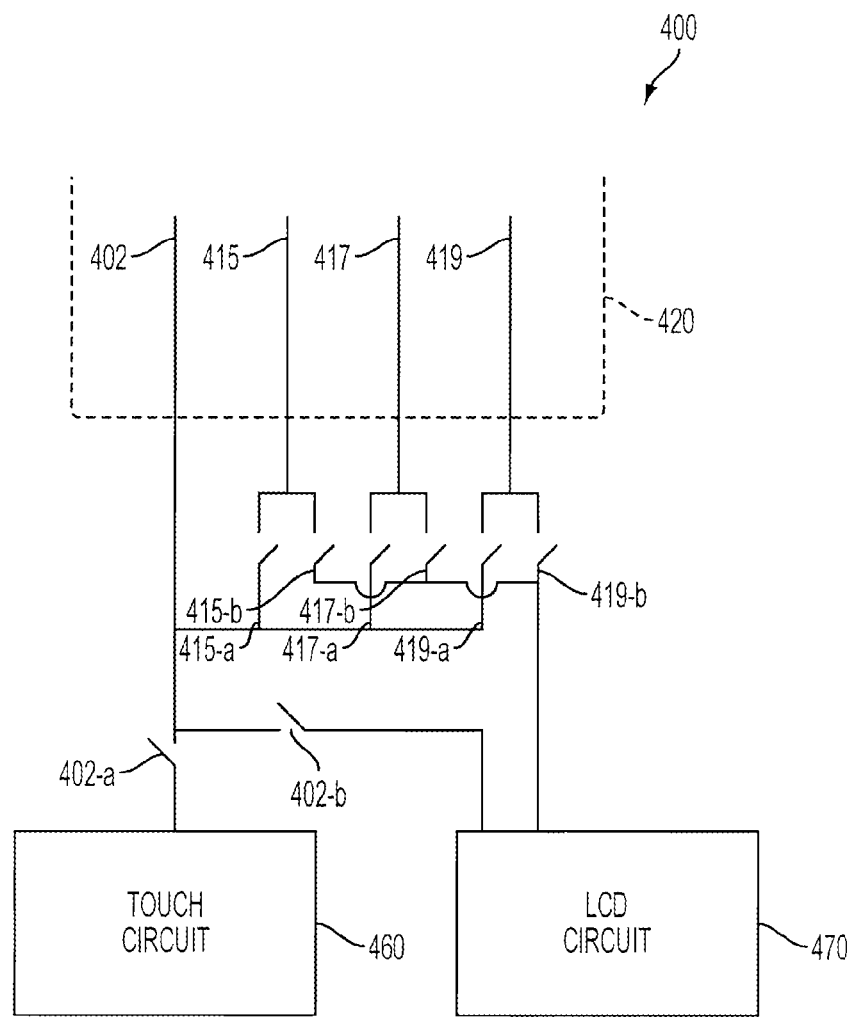
FIG. 4 illustrates another partial circuit diagram of an exemplary pixel in an LCD having display and touch modes in which one or more data lines of the pixel can be configured to couple with a sense line of the pixel during touch mode according to various embodiments.

FIG. 4 illustrates another partial circuit diagram of an exemplary pixel in an LCD having display and touch modes in which one or more data lines of the pixel can be configured to couple with a sense line of the pixel during touch mode according to various embodiments. In the example of FIG. 4, circuit 400 can include pixels having sense region 420, where each pixel can have sense line 402, which can be yVcom, and red, green, and blue data lines 415, 417, 419, respectively. Although only one pixel is illustrated in FIG. 4, it is to be understood that a sense region can include pixels having sense lines and red, green, and blue data lines according to various embodiments.

For touch mode, sense line 402 can couple to touch circuit 460 for sensing a touch or near touch based on touch signals transmitted over the sense line. Switch 402-*a* can couple the sense line 402 to the touch circuit 460. Data lines 415, 417, 419 can couple to the sense line 402 so as to form one electrical load on the touch circuit 460, thereby reducing the parasitic capacitance formed between the data lines and the sense plate and avoiding adverse operation of the touch circuit. Switches 415-*a*, 417-*a*, 419-*a* can couple data lines 415, 417, 419, respectively, via the sense line 402 to the touch circuit 460 for sensing a touch or near touch.

For display mode, data lines 415, 417, 419 can couple to LCD circuit 470 for displaying graphics or data based on display data signals transmitted over the data lines. Switches 415-*b*, 417-*b*, 419-*b* can couple data lines 415, 417, 419, respectively, to the LCD circuit 470, which can then transmit data signals along the data lines for displaying graphics or data on the LCD. The sense line 402 can couple to the LCD circuit 470 to hold an xVcom signal when not being used for touch. Switch 402-*b* can couple the sense line 402 to xVcom from the LCD circuit 470.

Figure 5:
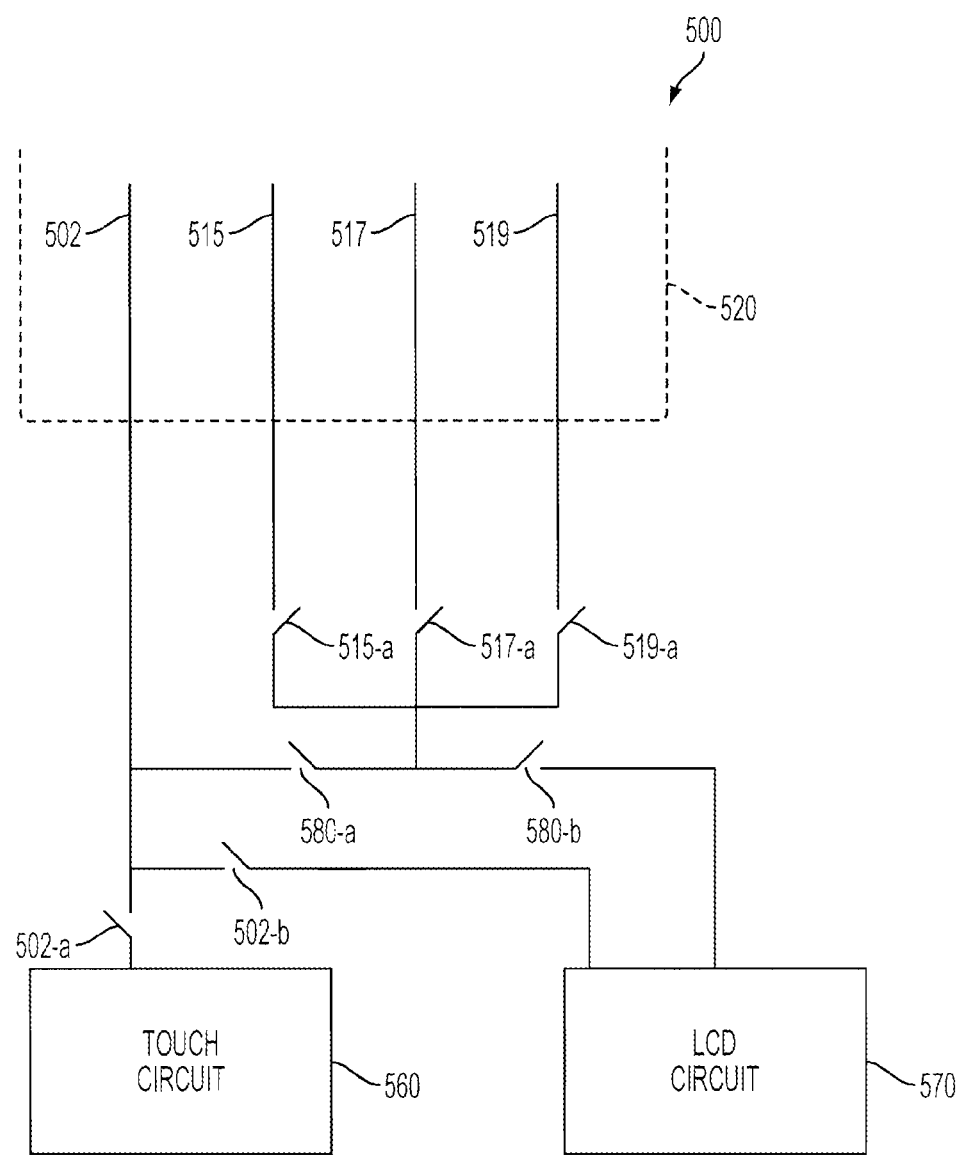
FIG. 5 illustrates another partial circuit diagram of an exemplary pixel in an LCD having display and touch modes in which one or more data lines of the pixel can be configured to couple with a sense line of the pixel during touch mode according to various embodiments.

FIG. 5 illustrates another partial circuit diagram of an exemplary pixel in an LCD having display and touch modes in which one or more data lines of the pixel can be configured to couple with a sense line of the pixel during touch mode according to various embodiments. In the example of FIG. 5, circuit 500 can include pixels having sense region 520, where each pixel can have sense line 502, which can be yVcom, and red, green, and blue data lines 515, 517, 519, respectively. Although only one pixel is illustrated in FIG. 5, it is to be understood that a sense region can include pixels having sense lines and red, green, and blue data lines according to various embodiments.

For touch mode, sense line 502 can couple to touch circuit 560 for sensing a touch or near touch based on touch signals transmitted over the sense line. Switch 502-*a* can couple the sense line 502 to the touch circuit 560. Data lines 515, 517, 519 can couple to the sense line 502 so as to form one electrical load on the touch circuit 560, thereby reducing the parasitic capacitance formed between the data lines and the sense plate and avoiding adverse operation of the touch circuit. Switches 515-*a*, 517-*a*, 519-*a* can couple the data lines 515, 517, 519, respectively, together and switch 580-*a* can couple the data lines via the sense line 502 to the touch circuit 560 for sensing a touch or near touch.

For display mode, data lines 515, 517, 519 can couple to LCD circuit 570 for displaying graphics or data based on display data signals transmitted over the data lines. Switches 515-*a*, 517-*b*, 519-*a* can couple the data lines 515, 517, 519, respectively, together and switch 580-*b* can couple the data lines to the LCD circuit 570, which can then transmit data signals along the data lines for displaying graphics or data on the LCD. The sense line 502 can couple to the LCD circuit 570 to hold an xVcom signal when not being used for touch. Switch 502-*b* can couple the sense line 502 to xVcom from the LCD circuit 570.

Figure 6:
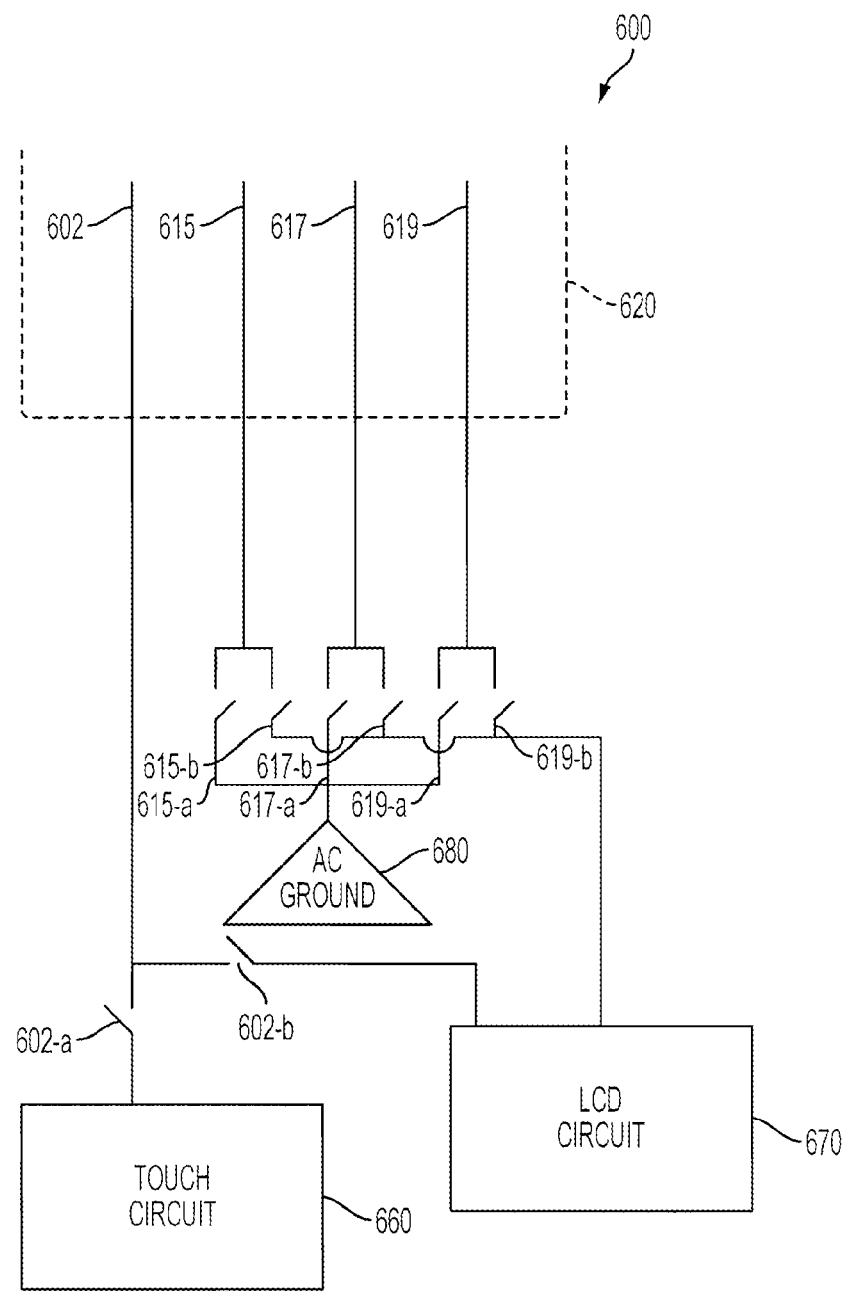
FIG. 6 illustrates a partial circuit diagram of an exemplary pixel in an LCD having display and touch modes in which one or more data lines of the pixel can be configured to couple to ground during touch mode according to various embodiments.

FIG. 6 illustrates a partial circuit diagram of an exemplary pixel in an LCD having display and touch modes in which one or more data lines of the pixel can be configured to couple to ground during touch mode according to various embodiments. In the example of FIG. 6, circuit 600 can include pixels having sense region 620, where the pixels can have sense line 602, which can be yVcom, and red, green, and blue data lines 615, 617, 619, respectively. Although only one pixel is illustrated in FIG. 6, it is to be understood that a sense region can include pixels having sense lines and red, green, and blue data lines according to various embodiments.

For touch mode, sense line 602 can couple to touch circuit 660 for sensing a touch or near touch based on touch signals transmitted over the sense line. Switch 602-*a* can couple the sense line 602 to the touch circuit 660. Data lines 615, 617, 619 can couple to ground so as to reduce parasitic capacitance formed between the data lines and xVcom on the sense region 620, thereby reducing adverse effects on the touch circuit. Switches 615-*a*, 617-*a*, 619-*a* can couple data lines 615, 617, 619, respectively, to AC ground 680. Alternatively, the data lines 615, 617, 619 can couple to a DC source.

For display mode, data lines 615, 617, 619 can couple to LCD circuit 670 for displaying graphics or data based on display data signals transmitted over the data lines. Switches 615-*b*, 617-*b*, 619-*b* can couple data lines 615, 617, 619, respectively, to the LCD circuit 670, which can then transmit data signals along the data lines for displaying graphics or data on the LCD. The sense line 602 can couple to the LCD circuit 670 to hold an xVcom signal when not being used for touch. Switch 602-*b* can couple the sense line 602 to xVcom from the LCD circuit 670.

Figure 7:
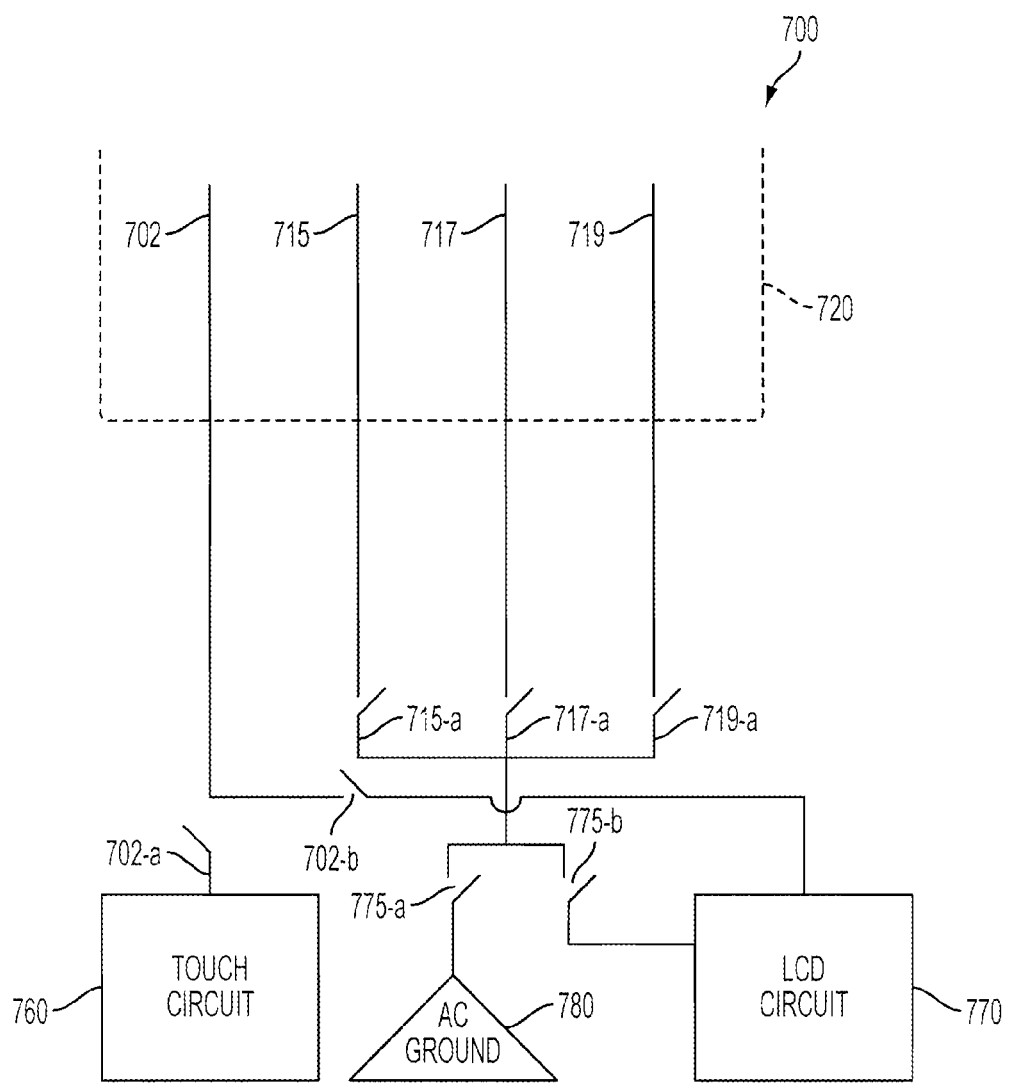
FIG. 7 illustrates another partial circuit diagram of an exemplary pixel in an LCD having display and touch modes in which one or more data lines of the pixel can be configured to couple to ground during touch mode according to various embodiments.

FIG. 7 illustrates another partial circuit diagram of an exemplary pixel in an LCD having display and touch modes in which one or more data lines of the pixel can be configured to couple to ground during touch mode according to various embodiments. In the example of FIG. 7, circuit 700 can include pixels having sense region 720, where the pixels can have sense line 702, which can be yVcom, and red, green, and blue data lines 715, 717, 719, respectively. Although only one pixel is illustrated in FIG. 7, it is to be understood that a sense region can include pixels having sense lines and red, green, and blue data lines according to various embodiments.

For touch mode, sense line 702 can couple to touch circuit 760 for sensing a touch or near touch based on touch signals transmitted over the sense line. Switch 702-a can couple the sense line 702 to the touch circuit 760. Data lines 715, 717, 719 can couple to ground so as to reduce parasitic capacitance formed between the data lines and xVcom on the sense region 720, thereby reducing adverse effects on the touch circuit. Switches 715-a, 717-a, 719-a can couple data lines 715, 717, 719, respectively, together and switch 775-a can couple the data lines to AC ground 780. Alternatively, the data lines 715, 717, 719 can couple to a DC source.

For display mode, data lines 715, 717, 719 can couple to LCD circuit 770 for displaying graphics or data based on display data signals transmitted over the data lines. Switches 715-a, 717-a, 719-a can couple data lines 715, 717, 719, respectively, together and switch 775-b can couple the data lines to the LCD circuit 770, which can then transmit data signals along the data lines for displaying graphics or data on the LCD. The sense line 702 can couple to the LCD circuit 770 to hold an xVcom signal when not being used for touch. Switch 702-b can couple the sense line 702 to xVcom from the LCD circuit 770.

It is to be understood that the circuitry for handling parasitic capacitance is not limited to that illustrated in FIGS. 3-7, but may include other or additional components capable of handling parasitic capacitance according to various embodiments. Although FIGS. 3-7 show separate touch and LCD circuits, the circuits or portions thereof can be combined into a single application specific integrated circuit (ASIC).

In some embodiments, some of the data lines can be coupled to the sense line and some can be coupled to ground during the touch mode. For example, every other data line can be coupled to the sense line and the remainder data lines coupled to ground during the touch mode. Other configurations can also be possible depending on the needs of the LCD.

Figure 8:
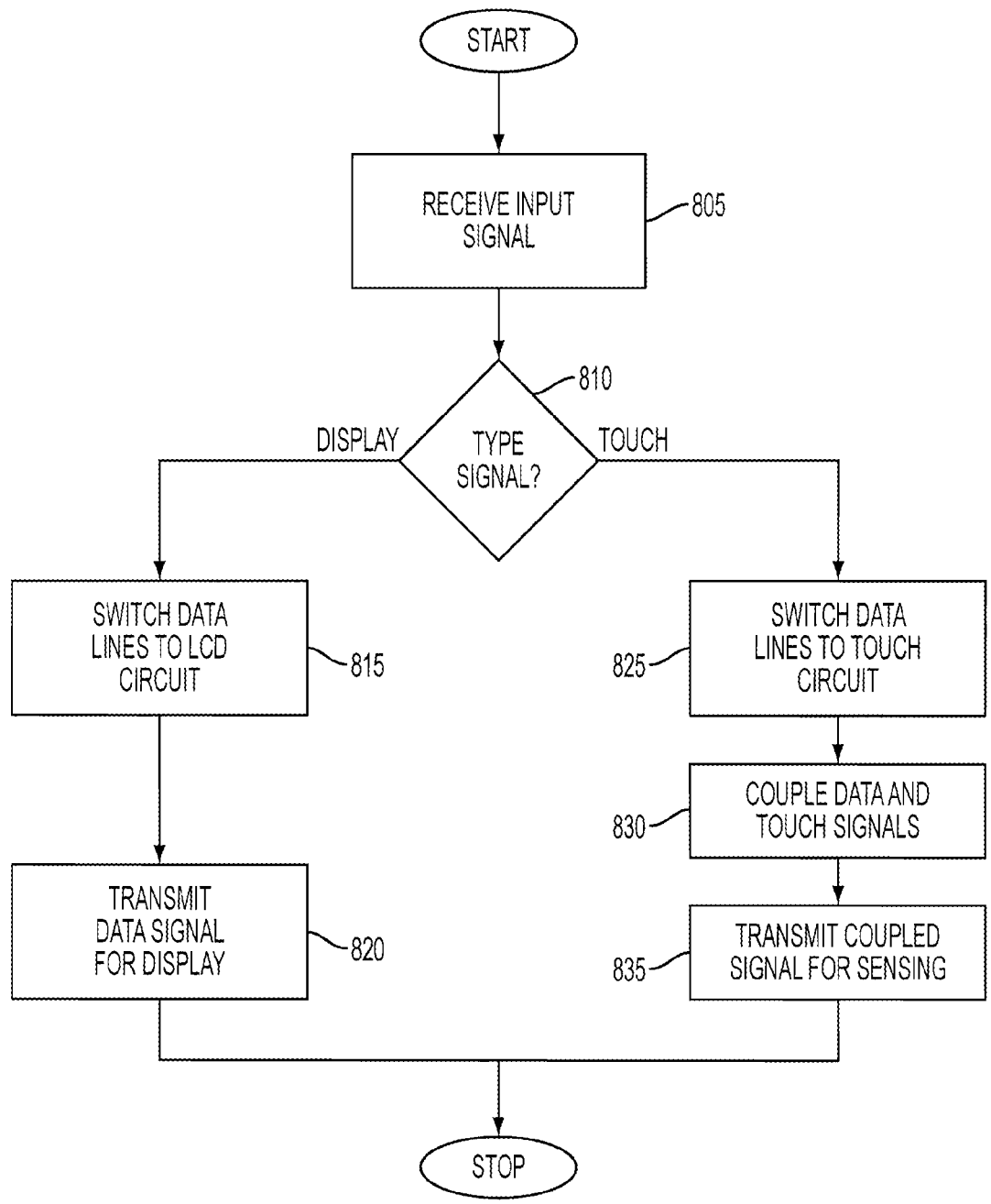
FIG. 8 illustrates an exemplary method for configuring one or more data lines of an LCD having display and touch modes to couple to a sense line of the LCD during touch mode according to various embodiments.

FIG. 8 illustrates an exemplary method for configuring one or more data lines of an LCD having display and touch modes to couple to a sense line of the LCD during touch mode according to various embodiments. The method can be executed on the circuits of FIGS. 3-5, for example. In the example of FIG. 8, an input signal can be received, indicating whether to execute in either display mode or touch mode (805, 810).

If the input signal is determined to be for display mode, data lines in the sense region of the LCD can be switched to couple to the LCD circuit in order to receive data signals (815). Once coupled, the LCD circuit can transmit data signals along the data lines for displaying graphics or data on the LCD (820). Optionally, sense lines in the sense region of the LCD can be switched to couple to the LCD circuit to hold at common voltage.

If the input signal is determined to be for touch mode, data lines in the sense region of the LCD can be switched to couple to the touch circuit via a corresponding sense line in the sense region (825). That is, the data lines can be coupled to the sense line, which can be coupled to the touch circuit. Touch signals can be transmitted along the sense line to indicate a touch or near touch on the LCD. Any residual data signals on the data lines can be coupled with the touch signals (830). The coupled signals can be transmitted to the touch circuit for sensing a touch on the LCD (835).

Figure 9:
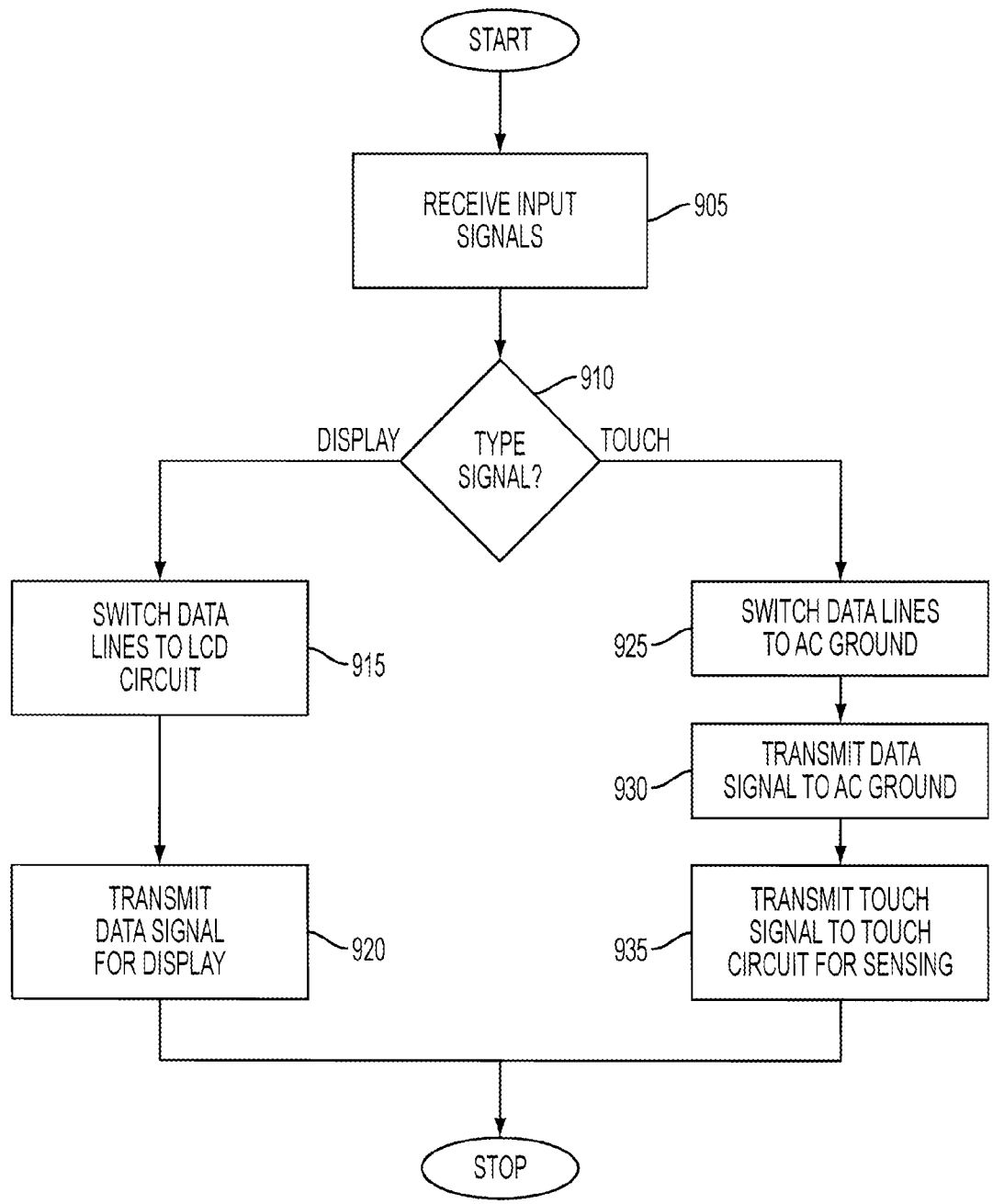
FIG. 9 illustrates another exemplary method for configuring one or more data lines of an LCD having display and touch modes to couple to ground during touch mode according to various embodiments.

FIG. 9 illustrates another exemplary method for configuring one or more data lines of an LCD having display and touch modes to couple to ground during touch mode according to various embodiments. The method can be executed by the circuits of FIGS. 6 and 7, for example. In the example of FIG. 9, an input signal can be received, indicating whether to execute either a display mode or a touch mode (905, 910).

If the input signal is determined to be for display mode, the data lines in the sense region of the LCD can be switched to couple to the LCD circuit (915). The LCD circuit can transmit data signals along the data lines for displaying on the LCD (920). Optionally, sense lines in the sense region can be coupled to the LCD circuit to hold to common voltage.

If the input signal is determined to be for touch mode, the data lines in the sense region can be switched to AC ground (925). Any residual data signals on the data lines can be transmitted to AC ground (930). A corresponding sense line can couple to the touch circuit. Touch signals can be transmitted along the sense line to the touch circuit for sensing a touch on the LCD (935).

It is to be understood that the methods for configuring an LCD having display and touch modes are not limited to those of FIGS. 8 and 9, but can include additional or other methods capable of performing according to various embodiments.

Figure 10:
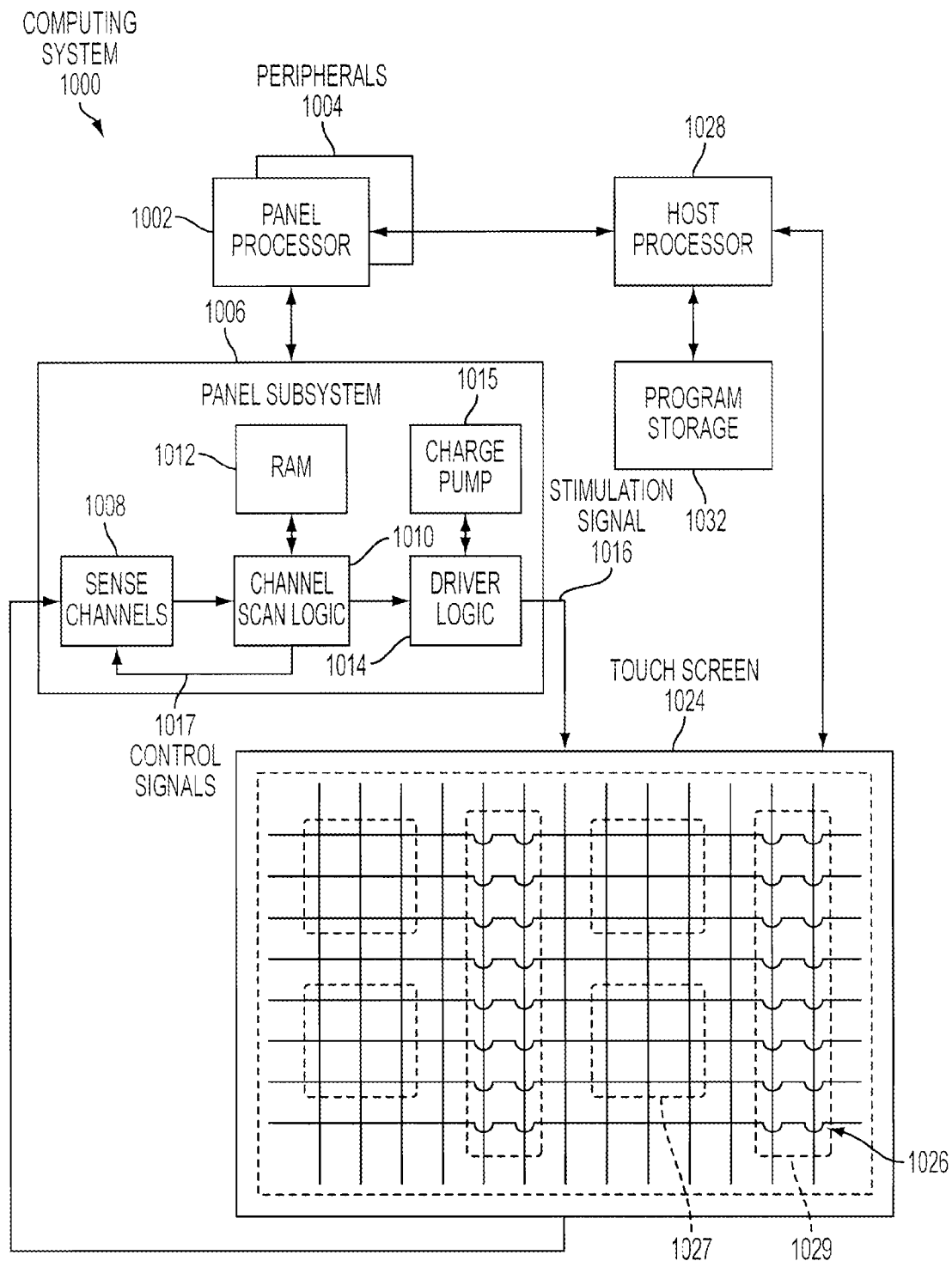
FIG. 10 illustrates an exemplary computing system having an LCD with display and touch modes according to various embodiments.

FIG. 10 illustrates an exemplary computing system that can include one or more of the various embodiments described herein. In the example of FIG. 10, computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic (analog or digital) 1010 and driver logic (analog or digital) 1014. Channel scan logic 1010 can access RAM 1012, autonomously read data from sense channels 1008 and provide control signals 1017 for the sense channels. In addition, channel scan logic 1010 can control driver logic 1014 to generate stimulation signals 1016 at various phases that can be simultaneously applied to drive regions of touch screen 1024. Panel subsystem 1006 can operate at a low digital logic voltage level (e.g. 1.7 to 3.3V). Driver logic 1014 can generate a supply voltage greater that the digital logic level supply voltages by cascading two charge storage devices, e.g., capacitors, together to form charge pump 1015. Charge pump 1015 can be used to generate stimulation signals 1016 that can have amplitudes of about twice the digital logic level supply voltages (e.g. 3.4 to 6.6V). Although FIG. 10 shows charge pump 1015 separate from driver logic 1014, the charge pump can be part of the driver logic. In some embodiments, panel subsystem 1006, panel processor 1002 and peripherals 1004 can be integrated into a single application specific integrated circuit (ASIC).

Touch screen 1024 can include a capacitive sensing medium having drive regions 1027 and sense regions 1029 according to various embodiments. Each drive region 1027 and each sense region 1029 can include capacitive elements, which can be viewed as pixels 1026 and which can be particularly useful when touch screen 1024 is viewed as capturing an "image" of touch. (In other words, after panel subsystem 1006 has determined whether a touch event has been detected at each touch sensor in the touch screen, the pattern of touch sensors in the multi-touch screen at which a touch event occurred can be viewed as an "image" of touch (e.g. a pattern of fingers touching the screen).) The presence of a finger or other object near or on the touch screen can be detected by measuring changes to a signal charge present at the pixels being touched, which is a function of signal capacitance. Each sense region of touch screen 1024 can drive sense channel 1008 in panel subsystem 1006.

Computing system 1000 can also include host processor 1028 for receiving outputs from panel processor 1002 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and touch screen 1024 such as an LCD for providing a user interface to a user of the device.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch screen is not limited to touch, as described in FIG. 10, but may be a proximity screen or any other screen switchable between a display mode and a touch mode according to various embodiments. In addition, the touch sensor panel described herein can be either a single-touch or a multi-touch sensor panel.

Figure 11A:
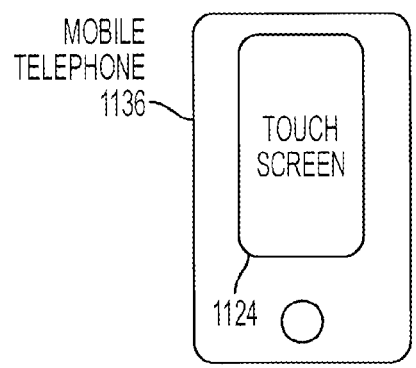
FIG. 11a illustrates an exemplary mobile telephone having an LCD with display and touch modes according to various embodiments.

FIG. 11a illustrates an exemplary mobile telephone 1136 that can include touch screen 1124 and other computing system blocks that can be utilized for configuring data lines of the touch screen during touch mode of the telephone.

Figure 11B:
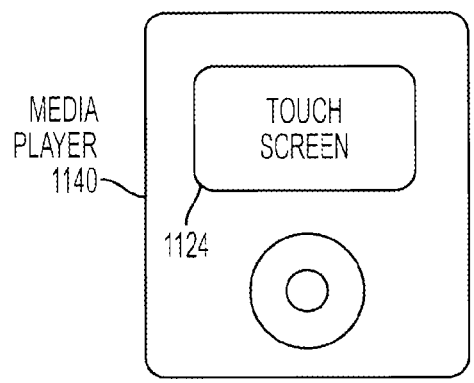
FIG. 11b illustrates an exemplary digital media player having an LCD with display and touch modes according to various embodiments.

FIG. 11b illustrates an exemplary digital media player 1140 that can include touch screen 1124 and other computing system blocks that can be utilized for configuring data lines of the touch screen during touch mode of the media player.

Figure 11C:
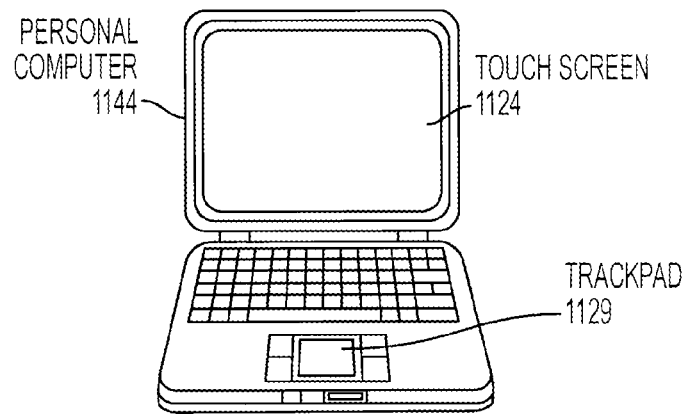
FIG. 11c illustrates an exemplary personal computer having an LCD with display and touch modes according to various embodiments.

FIG. 11c illustrates an exemplary personal computer 1144 that can include touch screen 1124, touch sensor panel (trackpad) 1126, and other computing system blocks that can be utilized for configuring data lines of the touch screen during touch mode of the personal computer.

The mobile telephone, media player, and personal computer of FIGS. 11a, 11b and 11c can be cost and power saving with an LCD having display and touch modes with configurable data lines according to various embodiments.

Although various embodiments have been fully described with reference to the accompanying drawings, it is to be noted that various changes and modifications will become apparent to those skilled in the art. Such changes and modifications are to be understood as being included within the scope of various embodiments as defined by the appended claims.

What is claimed is:

1. A display device switchable between a display mode and a touch mode, the device comprising:
   at least a first and second drive region, each having a plurality of display pixels having storage capacitors connected together along first and second, different directions by first and second common voltage lines;
   a sense region positioned between the first and second drive regions, the sense region having a plurality of display pixels having storage capacitors connected together along the first and second directions by third and fourth common voltage lines,
   the first common voltage lines of the first drive region electrically bypassing the sense region to couple to the first common voltage lines of the second drive region;
   each display pixel of the sense region having a data line configured to transmit a display data signal and a sense line configured to transmit a touch signal, the sense line coupled to a touch circuit, and the sense line being distinct from the data line;
   a switch configured to switch the data line between a first configuration associated with a display mode and a second configuration associated with a touch mode; and
   wherein in the second configuration, the data lines of at least some of the display pixels of the sense region are coupled to ground while others of the data lines are coupled to the sense line, the sense line being coupled to a touch circuit in order to sense a touch or near touch on the device.

2. The device of claim 1, wherein the first configuration comprises the data line coupled to a display circuit of the device for sending the transmitted display data signal in order to display graphics or data on the device.

3. The device of claim 1, comprising:
   the touch circuit configured to receive the touch signal from the sense line and a residual data signal from the data lines of others of the display pixels in the sense region which are not coupled to ground during the touch mode in order to sense a touch or near touch on the device.

4. The device of claim 1, comprising:
   a display circuit configured to send the display data signal to the data line during the display mode in order to display graphics or data on the device.

5. The device of claim 1, further comprising one or more other switches configured to couple the sense line to the touch circuit in the second configuration and to couple the sense line to receive a common voltage in the first configuration.

6. The device of claim 1 incorporated into at least one of a mobile telephone, a digital media player, or a personal computer.

7. A display device having a display mode and a touch mode, comprising:
   at least a first and second drive region, each having a plurality of display pixels having storage capacitors connected together along first and second, different directions by first and second common voltage lines;
   a sense region positioned between the first and second drive regions, the sense region having a plurality of display pixels having storage capacitors connected together along the first and second directions by third and fourth common voltage lines;
   each of the plurality of display pixels of the sense region having a data line and a distinct sense line;
   the first common voltage lines of the first drive region electrically bypassing the sense region to couple to the first common voltage lines of the second drive region; and
   wherein at least some of the data lines of the plurality of display pixels of the sense region are configured to couple to ground during a touch mode for reducing parasitic capacitance created by the data line.

8. The device of claim 7, comprising:
   a switch configured to couple the data lines of others of the display pixels in the sense region which are not coupled to ground to the sense line during the touch mode.

9. The device of claim 8, wherein the switch is configured to decouple the data line from the sense line during a display mode.

10. The device of claim 7, comprising:
    a switch configured to couple the data line to a display circuit during a display mode.

11. The device of claim 10, wherein the switch is configured to decouple the data line from the display circuit during the touch mode.

12. A display device having a display mode and a touch mode, comprising:
    a plurality of pixels, each of the plurality of pixels having a data line and a sense line, the sense line being distinct from the data line, wherein some of the data lines are configured to couple to a touch circuit to sense touch or near touch on the device during the touch mode and others of the data lines are configured to couple to ground during the touch mode for reducing parasitic capacitance created by the data line; and
    the display device further comprising at least one switch configured to couple the sense lines of at least some of the pixels to receive a common voltage during the display mode.

13. The device of claim 12, wherein the ground is one of an AC ground or a DC ground.

14. The device of claim 12, comprising one or more switches configured to couple the some and the others of the data lines to a display circuit during the display mode, the display circuit configured to send display data based on a display data signal to the coupled data lines.

15. The device of claim 12, wherein the sense line is coupled to the touch circuit during the touch mode, the touch circuit configured to sense a touch based on touch signals received from the coupled sense lines.

16. A method for configuring a display device having a display mode and a touch mode, the method comprising:
    for a touch mode, switching some of a plurality of data lines corresponding to a plurality of pixels of the device to couple to a plurality of sense lines of the device and others of the plurality of data lines of the device to couple to ground, the plurality of sense lines being distinct from the some and the others of the plurality of data lines; and
    for the display mode, coupling the sense lines of at least some of the pixels to receive a common voltage during the display mode.

17. The method of claim 16, comprising:
    for a display mode, switching the some and the others of the plurality of data lines to couple to a display circuit of the device.

18. The method of claim 16, comprising:
    for the touch mode comprising the some of the plurality of data lines coupled to the plurality of sense lines, transmitting first signals from the plurality of sense lines with second signals from the some of the plurality of data lines to a touch circuit to sense a touch or near touch on the display device.

19. The method of claim 18, comprising: for the touch mode comprising the others of the plurality of data line coupling to ground, transmitting a first signal from the others of the plurality of data lines to ground and a second signal from the plurality of sense lines to a touch circuit of the device to sense a touch or near touch on the device.

20. A method for switching a display device between a display mode and a touch mode, the display device having a plurality of pixels with sense lines and data lines, the data lines being distinct from the sense lines, the method comprising:
    determining whether a mode signal is associated with a display mode or a touch mode for a display device;
    for the determined mode signal associated with the display mode, coupling the data lines of the plurality of pixels of the display device to a display circuit of the display device; and
    for the determined mode signal associated with the touch mode; and
    coupling at least some of the data lines to ground and decoupling the some of the data lines from the display circuit.

21. The method of claim 20, comprising:
    during the display mode, coupling the sense lines of at least some of the plurality of pixels to receive a common voltage; and
    during the touch mode, switching others of the plurality of data lines to ground and decoupling the others of the plurality of data lines from the display circuit.

* * * * *